United States Patent
Park et al.

(10) Patent No.: US 10,730,753 B2
(45) Date of Patent: Aug. 4, 2020

(54) ECO-FRIENDLY METHOD FOR MANUFACTURING OF POROUS SILICON CARBIDE STRUCTURE

(71) Applicant: Korea Institute of Science and Technology, Seoul (KR)

(72) Inventors: Sang Whan Park, Seoul (KR); Mi Rae Youm, Seoul (KR); Sung Il Yun, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 180 days.

(21) Appl. No.: 16/171,408

(22) Filed: Oct. 26, 2018

(65) Prior Publication Data

US 2019/0144287 A1    May 16, 2019

(30) Foreign Application Priority Data

Nov. 13, 2017    (KR) .......... 10-2017-0150319

(51) Int. Cl.
*C01B 32/963* (2017.01)
*B01J 27/224* (2006.01)

(52) U.S. Cl.
CPC .......... *C01B 32/963* (2017.08); *B01J 27/224* (2013.01); *C01P 2002/70* (2013.01); *C01P 2002/74* (2013.01); *C01P 2004/03* (2013.01); *C01P 2004/04* (2013.01); *C01P 2004/61* (2013.01); *C01P 2004/62* (2013.01); *C01P 2004/64* (2013.01); *C01P 2006/12* (2013.01); *C01P 2006/16* (2013.01); *C01P 2006/21* (2013.01); *C01P 2006/90* (2013.01)

(58) Field of Classification Search
None
See application file for complete search history.

(56) References Cited

U.S. PATENT DOCUMENTS

| 5,338,353 | A | * | 8/1994 | Uchino | ..... B01D 1/18 106/416 |
| 5,340,417 | A | * | 8/1994 | Weimer | ..... B01J 8/12 148/513 |
| 7,910,082 | B2 | | 3/2011 | Dawes et al. | |
| 2011/0175024 | A1 | * | 7/2011 | Lang | ..... C04B 35/565 252/182.32 |

(Continued)

FOREIGN PATENT DOCUMENTS

| CN | 1401564 A | 3/2003 |
| KR | 10-0952341 B1 | 4/2010 |

(Continued)

OTHER PUBLICATIONS

Ledoux, Marc J., et al., "New Synthesis and Uses of High-Specific-Surface SiC as a Catalytic Support that is Chemically Inert and Has High Thermal Resistance." *Journal of Catalysis*, vol. 114, Issue 1, 1988, (pp. 176-185).

(Continued)

*Primary Examiner* — Mary Lynn F Theisen
(74) *Attorney, Agent, or Firm* — NSIP Law

(57) ABSTRACT

The present invention relates to an eco-friendly method for preparing a porous silicon carbide structure, which is capable of preparing a porous silicon carbide structure having meso- or macro-sized pores without using a harmful phenolic resin as a carbon source.

17 Claims, 4 Drawing Sheets

(56) References Cited

U.S. PATENT DOCUMENTS

| | | | |
|---|---|---|---|
| 2013/0129598 A1* | 5/2013 | Han | .................. C04B 35/573 |
| | | | 423/345 |
| 2014/0178285 A1* | 6/2014 | Han | .................. C01B 32/97 |
| | | | 423/345 |
| 2017/0073233 A1* | 3/2017 | Park | .................. C01B 32/984 |
| 2017/0081197 A1* | 3/2017 | Park | .................. C01B 32/97 |

FOREIGN PATENT DOCUMENTS

| | | |
|---|---|---|
| KR | 10-1157044 B1 | 6/2012 |
| KR | 10-1627371 B1 | 6/2016 |
| KR | 10-1678622 B1 | 11/2016 |
| WO | WO 2014/207096 A1 | 12/2014 |

OTHER PUBLICATIONS

Vix-Guterl, C., et al., "SiC Material Produced by Carbothermal Reduction of a Freeze Gel Silica-carbon Artefact ", *Journal of the European Ceramic Society*, vol. 19, Issue 4, 1999, (pp. 427-432).

Guo, Xiang-Yun, et al., "Pore-size control in the sol-gel synthesis of mesoporous silicon carbide." *Journal of Materials Science*, vol. 40, Issue 5, Mar. 2005, (pp. 1301-1303).

Lim, Kwang-Young, et al. "Effect of Carbon Source on Porosity and Flexural Strength of Porous Self-Bonded Silicon Carbide Ceramics", *Journal of the Korean Ceramic Society*, vol. 45, No. 7, 2008, (pp. 430-437).

\* cited by examiner

ECO-FRIENDLY METHOD FOR MANUFACTURING OF POROUS SILICON CARBIDE STRUCTURE

CROSS-REFERENCE TO RELATED APPLICATIONS

This application claims the benefit under 35 U.S.C. § 119(a) of Korean Patent Application No. 10-2017-0150319, filed on Nov. 13, 2017, in the Korean Intellectual Property Office, the entire disclosure of which is incorporated herein by reference for all purposes.

BACKGROUND

(a) Technical Field

The present invention relates to an eco-friendly method for preparing a porous silicon carbide structure, which is capable of preparing a porous silicon carbide structure having meso- or macro-sized pores without using a harmful phenolic resin as a carbon source.

(b) Background Art

Porous ceramic materials are generally classified into macroporous materials (d>50 nm), mesoporous materials (50 nm>d>2 nm) and microporous material (d<2 nm) depending on average pore size according to the standard of the International Union of Pure and Applied Chemistry (IUPAC).

The porous ceramic materials are widely used as key materials in various industrial fields as, for example, catalyst supports, water and dust filter materials, adsorbents, insulating materials, gas-phase separation materials, electrode materials, artificial biomaterials, shock-absorbing materials, etc. In particular, the applications of the porous ceramic materials are increasing greatly with the development of environmental and energy industries requiring high-temperature stability, chemical resistance, superior mechanical properties, etc.

Silicon carbide (SiC) is a non-oxide-based ceramic material widely used in various industries operating under harsh environment conditions because it exhibits superior thermomechanical properties such as high-temperature stability, wear resistance, thermal shock resistance, thermal conductivity, etc. as well as superior corrosion resistance and chemical resistance properties.

In particular, porous silicon carbide is a multi-functional material having functionality suited for applications in addition to the superior physicochemical properties of silicon carbide. It is widely used as a key material for high-temperature dust or water purification filters, catalyst supports, separation membranes, etc. in various applications of semiconductor, energy and environmental industries requiring stable operation under harsh environments.

Recently, with the development of technologies capable of controlling pore structure, the porous silicon carbide is developed as a material that can be used under harsh environments to which the existing porous oxide structures cannot be applied. In particular, it is developed as a catalyst support for the partial oxidation of methane, a catalyst support for the selective oxidation of $H_2S$ or a catalyst support for Fischer-Tropsch reaction and is widely used. Specifically, porous silicon carbide having meso-sized pores with a large specific surface area is commonly used to catalytically activate gaseous materials whereas porous silicon carbide meso- or macro-sized pores is used to catalytically activate liquid materials.

Most of the existing technologies prepare porous silicon carbide having micro- or meso-sized pores in the form of a powder for use as a catalyst support and the technologies for preparing a porous silicon carbide structure having micro- or meso-sized pores with a predetermined shape having superior applicability in many applications and superior mechanical and structural properties are extremely limited.

In the technology of preparing porous silicon carbide having micro- or meso-sized pores in the form of a powder according to M. I. Ledoux et al, *J. Catal.* 114 (1988) 176 and Vix-Guterl et al. *J. European Ceram. Soc.,* 19 (1999) 427, porous silicon carbide having micro- or meso-sized pores are prepared by carbothermal reduction using an expensive $SiO_2$ or C template having mesopores or porous silicon carbide powder having micro- or meso-sized pores is prepared by silicon carbide synthesis between a silicon-containing gas and carbon.

Also, a technology of preparing porous silicon carbide powder having micro- or meso-sized pores by carbothermal reduction using an organic carbon compound such as a phenolic resin together with a solid carbon source or by silicon carbide synthesis between a silicon-containing gas and carbon is reported.

X-Y Guo et al, *J. Mater. Sci.* 40 (2005) 1301 reports a technology of synthesizing mesoporous silicon carbide powder with a pore size of 3.5-45 nm and a specific surface area of 40-200 $m^2/g$ by processing a phenolic resin and TEOS (tetraethyl orthosilicate) through a sol-gel process and heat-treating the same at 1250° C. for 20 hours.

And, U.S. Pat. No. 7,910,082 reports a method for preparing mesoporous silicon carbide powder with a specific surface area of 400-900 $m^2/g$ and an average pore size of 6 nm or smaller using a precursor prepared from a phenolic resin and TEOS (tetraethyl orthosilicate).

CN 001401564 A reports a method for preparing mesoporous silicon carbide powder with a specific surface area of 60-120 $m^2/g$ and a pore size of 3-50 nm by dissolving a phenolic resin in a solvent by adding a transition metal salt, ethyl silicate (or methyl or propyl silicate) and an inorganic acid salt, hydrolyzing, crosslinking and drying the silicate and then heat-treating the same at 1200-1400° C. for 5-24 hours.

WO 2014/207096 A1 (PCT/EP2014/063503) reports a technology for preparing a catalyst support with a porous silicon carbide structure for Fischer-Tropsch reaction having a predetermined shape and meso-sized pores. A carbon preform having meso-sized pores is formed by mixing an organic carbon compound such as a phenolic resin, etc. with a silicon powder, silicon oxide or a silicon compound and the porous silicon carbide structure having mesopores is formed by heat-treating the same under an appropriate condition and atmosphere.

As described above, the existing methods for preparing porous silicon carbide powder having mesopores reported thus far use a $SiO_2$ or carbon template having a mesopore structure or use a carbon precursor such as a phenolic resin, etc. to achieve a mesopore structure.

However, the processes using resins such as the phenolic resin create environments harmful to the human body. Therefore, use of phenolic resins is strictly restricted in semiconductor or display manufacturing industries recently. Accordingly, an eco-friendly technology for preparing a porous silicon carbide structure without using a phenolic resin is required for extended application of the mesoporous silicon carbide structure in future industries and protection of industrial manpower.

REFERENCES OF THE RELATED ART

Patent Documents (Patent document 1) U.S. Pat. No. 7,910,082.
(Patent document 2) CN 001401564 A.
(Patent document 3) WO 2014/207096 A1 (PCT/EP2014/063503).

Non-Patent Documents (Non-patent document 1) M. I. Ledoux et al, *J. Catal.* 114 (1988) 176.
(Non-patent document 2) Vix-Guterl et al. *J. European Ceram. Soc.,* 19 (1999) 427.
(Non-patent document 3) X-Y Guo et al, *J. Mater. Sci.* 40 (2005) 1301.

SUMMARY

The present invention is directed to providing an eco-friendly method for preparing a porous silicon carbide structure without using a phenolic resin as a carbon source.

The present invention is also directed to providing a method for preparing a porous silicon carbide structure, which allows easy control of pore size, porosity and specific surface area.

The present invention is also directed to providing a method for preparing a porous silicon carbide structure having superior mechanical properties such as strength, etc.

The purposes of the present invention are not limited to those described above. The purposes of the present invention will be apparent from the following description and will be embodied by the means described in the appended claims and combinations thereof.

The method for preparing a porous silicon carbide structure according to the present invention may include a step of preparing a first solution by dispersing a carbon source and a binder in a solvent, a step of preparing a second solution by dispersing a silicon source in a solvent, a step of preparing a slurry by adding the second solution to the first solution and mixing the same, a step of obtaining a powder wherein the carbon source is coated on the surface of the silicon source by granulating the slurry, a step of forming a preform of a predetermined shape from the powder and a step of heat-treating the preform.

The carbon source may not contain a phenolic resin.

The carbon source may be carbon black having an average particle diameter ($d_{50}$) of 0.08-45 μm and a specific surface area of 80-200 $m^2/g$.

The carbon source may further contain 3-10 wt % of one selected from a group consisting of a single-walled carbon nanotube (SWCNT), a double-walled carbon nanotube (DWCNT), a multi-walled carbon nanotube (MWCNT) and a mixture thereof having a length of 10-30 μm based on 100 wt % of the carbon source.

The binder may be a silane-based binder selected from a group consisting of hexadecyltrimethoxysilane, trimethoxymethylsilane, trimethoxy(propyl)silane, trimethoxyhexylsilane and a mixture thereof.

The silicon source may be a silicon powder having an average particle diameter of 0.2-10 μm.

The solvent of the first solution and the second solution may be selected from a group consisting of ethanol, isopropyl alcohol (IPA) and a mixture thereof.

The second solution may be added to the first solution such that a molar ratio (C/Si) of the carbon source and the silicon source is 1.0-2.5.

The second solution may be added little by little while stirring the first solution and then mixed at 200-400 rpm.

Before granulating the slurry, a processing aid selected from a group consisting of polyvinyl butyral (PVB), polyvinyl alcohol (PVA), polyvinylpyrrolidone (PVP) and a mixture thereof may be added to the slurry.

The granulation of the slurry may be performed by drying the slurry under a vacuum atmosphere at 20-40° C. for 30-60 minutes such that the solvent remains at a content of 1-5 wt %.

The powder wherein the carbon source is coated on the silicon source may have an average particle diameter of 50-200 μm.

The preform of a predetermined shape may be formed by compressing the powder at 0.3-1 MPa.

The preform may be heat-treated firstly at 100-200° C. for 1-3 hours, heat-treated secondly at 500-800° C. for 30 minutes to 3 hours after raising temperature at a rate of 5-10° C./min and heat-treated thirdly at 1150-1400° C. for 10-24 hours after raising temperature at a rate of 1-10° C./min, wherein the first heat treatment, the second heat treatment and the heat treatment may be performed continuously under an inert atmosphere.

The method may further include, after the heat treatment is completed, a step of removing carbon remaining in the porous silicon carbide structure through oxidation.

The porous silicon carbide structure may contain β-phase silicon carbide.

The porous silicon carbide structure may have a specific surface area of 30-100 $m^2/g$, an average pore size of 5-200 nm, a porosity of 60-80% and a compressive strength of 10-30 MPa.

The present invention is advantageous in securing the price competitiveness of the porous silicon carbide structure because the expensive nanoporous carbon structure, silica, etc. are not used as starting materials.

The present invention is also advantageous in terms of eco-friendliness because the harmful phenolic resin is not used as a carbon source.

The present invention is also advantageous in that the pore size, porosity, specific surface area, etc. of the porous silicon carbide structure can be controlled through conditions that can be controlled relatively easily, such as the composition of the carbon source and the silicon source, the size of the silicon source, the type and size of the carbon source, heat treatment temperature, etc.

The present invention is also advantageous in that a porous silicon carbide structure with superior mechanical properties such as strength, etc. can be prepared.

The effect of the present invention is not limited to that described above. It is to be understood that the effect of the present invention includes all the effects that can be inferred from the following description.

DETAILED DESCRIPTION

Figure 1:
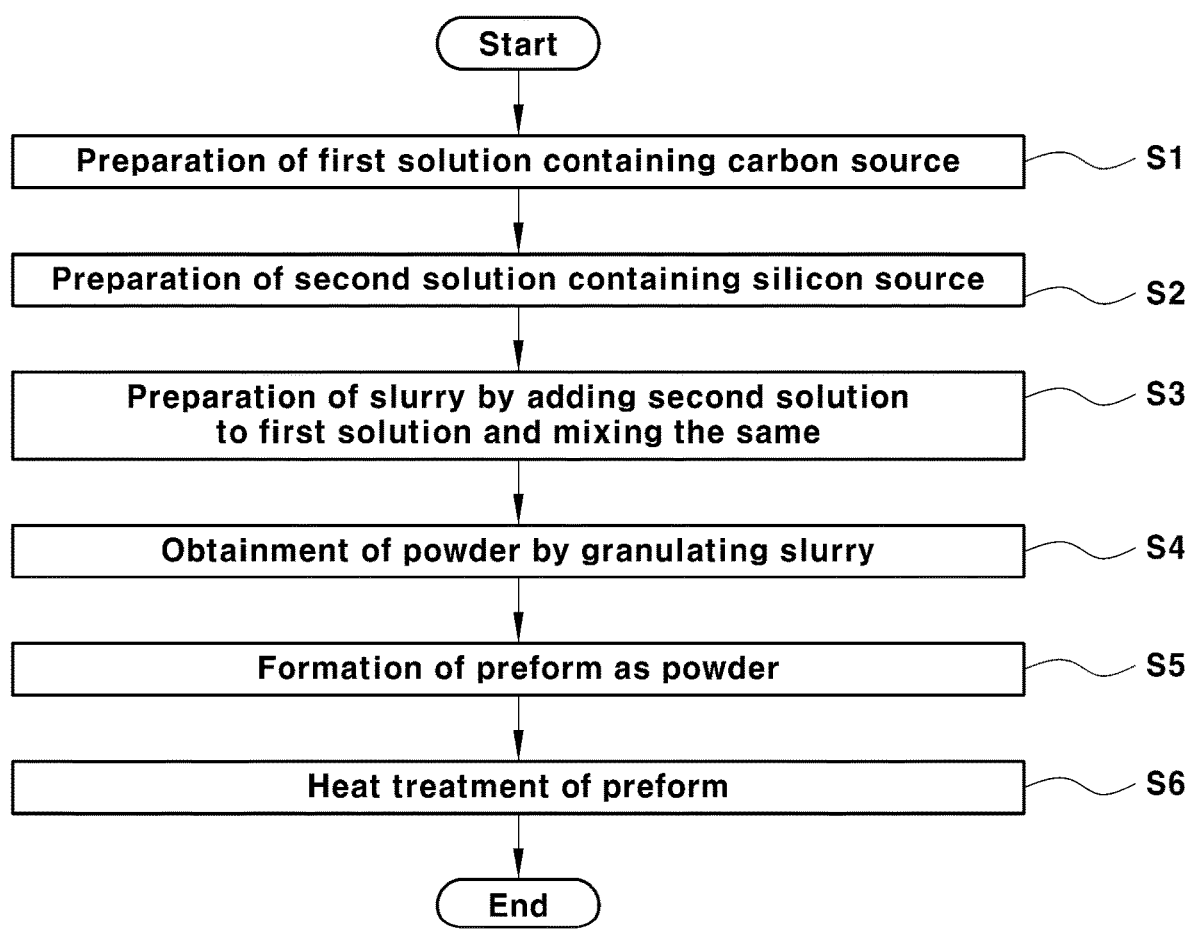
FIG. 1 schematically describes a method for preparing a porous silicon carbide structure according to the present invention.

Other objectives, features and advantages of the present invention will be easily understood through the following detailed description of specific exemplary embodiments and the attached drawings. However, the present invention is not limited to the exemplary embodiments and may be embodied in other forms. On the contrary, the exemplary embodiments are provided so that the disclosure of the present invention is completely and fully understood by those of ordinary skill. In the attached drawings, like numerals are used to represent like elements.

In the drawings, the dimensions of the elements are magnified for easier understanding of the present invention. Although the terms first, second, etc. may be used to describe various elements, these elements should not be limited by the terms. The terms are used only to distinguish one element from another. For example, a first element can be termed a second element and, similarly, a second element can be termed a first element, without departing from the scope of the present invention. A singular expression includes a plural expression unless the context clearly indicates otherwise.

In the present disclosure, the terms such as "include", "contain", "have", etc. should be understood as designating that features, numbers, steps, operations, elements, parts or combinations thereof exist and not as precluding the existence of or the possibility of adding one or more other features, numbers, steps, operations, elements, parts or combinations thereof in advance. In addition, when an element such as a layer, a film, a region, a substrate, etc. is referred to as being "on" another element, it can be "directly on" the another element or an intervening element may also be present. Likewise, when an element such as a layer, a film, a region, a substrate, etc. is referred to as being "under" another element, it can be "directly under" the another element or an intervening element may also be present.

Unless specified otherwise, all numbers, values and/or expressions that represent the components, reaction conditions and the quantity polymer compositions and mixtures used in the present invention represent approximate measures or limits to ranges to encompass minor deviations from the given values and are to be understood to be modified by "about". Also, the numerical ranges described in this disclosure are continuous and include all the values from the minimum value to the minimum value included in the ranges, unless specified otherwise. In addition, if the range indicates integers, all the integers from the minimum value to the minimum value are included.

Throughout this disclosure, the numerical ranges described for parameters are to be understood to include all the values included in the ranges including the described end points. For example, a range of "5-10" is to be understood to include not only the values 5, 6, 7, 8, 9 and 10 but also the subranges thereof such as 6-10, 7-10, 6-9, 7-9, etc. and any values between appropriate integers in the ranges such as 5.5, 6.5, 7.5, 5.5-8.5, 6.5-9, etc. In addition, a range of "10-30%", for example, is to be understood to include not only all the inter values 10%, 11%, 12%, 13%, . . . , 30% but also the subranges thereof such as 10-15%, 12-18%, 20-30%, etc. and any values between appropriate integers in the ranges such as 10.5%, 15.5%, 25.5%, etc.

FIG. 1 schematically describes a method for preparing a porous silicon carbide structure according to the present invention. Referring to the figure, the method for preparing a porous silicon carbide structure includes a step of preparing a first solution by dispersing a carbon source and a binder in a solvent (S1), a step of preparing a second solution by dispersing a silicon source in a solvent (S2), a step of preparing a slurry by adding the second solution to the first solution and mixing the same (S3), a step of obtaining a powder wherein the carbon source is coated on the surface of the silicon source by granulating the slurry (S4), a step of forming a preform of a predetermined shape from the powder (S5) and a step of heat-treating the preform (S6).

In the step of preparing the first solution (S1), a carbon source and a binder is dispersed in a solvent.

The present invention is characterized in that a phenolic resin is not used as the carbon source. In the present invention, the carbon source may be carbon black having an average particle diameter ($d_{50}$) of 0.08-45 μm and a specific surface area of 80-200 $m^2/g$. The average particle diameter ($d_{50}$) refers to a median diameter ($d_{50}$) obtained from the volume-based particle size distribution reduced to a sphere equivalent diameter through laser diffraction particle size analysis (wet method). If the average particle diameter ($d_{50}$) is smaller than 0.08 μm, the carbon source may not be dispersed uniformly in the first solution. And, if it exceeds 45 μm, the mechanical properties of the prepared porous silicon carbide structure as well as the pore characteristics of the porous silicon carbide structure such as porosity, pore size and pore distribution are negatively affected. If the specific surface area is smaller than 80 $m^2/g$, the pore characteristics of the prepared porous silicon carbide structure are unsatisfactory. And, if it exceeds 200 $m^2/g$, it may be difficult to prepare the preform.

The carbon source may further contain 3-10 wt % of one selected from a group consisting of a single-walled carbon nanotube (SWCNT), a double-walled carbon nanotube (DWCNT), a multi-walled carbon nanotube (MWCNT) and a mixture thereof having a length of 10-30 μm based on 100 wt % of the carbon source.

The specific surface area, compressive strength, porosity, etc. of the porous silicon carbide structure may be controlled easily by controlling the composition of the carbon source, which will be described later through examples.

The carbon source may be dispersed by adding at 3-5 wt % to the solvent based on 100 wt % of the first solution.

The method for dispersing the carbon source in the solvent is not particularly limited. For example, it may be dispersed through ball milling, sonication, etc. Also, the dispersing time is not particularly limited and the dispersion may be performed until the carbon source is dispersed uniformly enough.

The binder serves to attach the carbon source onto the surface of the silicon source. It may be a silane-based binder selected from a group consisting of hexadecyltrimethoxysilane, trimethoxymethylsilane, trimethoxy(propyl)silane, trimethoxyhexylsilane and a mixture thereof and its content may be 0.3-1 wt % based on 100 wt % of the carbon source.

The binder may be added simultaneously with the carbon source or may be added after the carbon source is dispersed uniformly in the solvent.

In the step of preparing the second solution (S2), a silicon source is dispersed in a solvent.

The silicon source may be a silicon powder having an average particle diameter of 0.2-10 μm, specifically 5 μm. If the average particle diameter is smaller than 0.2 μm, the prepared porous silicon carbide structure may be economically ineffective. And, if it exceeds 10 μm, the pore characteristics and mechanical properties of the prepared porous silicon carbide structure may be unsatisfactory because the gas-phase silicon source produced from the solid-phase silicon source contributes to the pore characteristics (pore size and pore distribution) of the porous silicon carbide structure. The specific surface area, compressive strength, porosity, etc. of the porous silicon carbide structure may be controlled easily by controlling the average particle diameter of the silicon source, which will be described later through examples.

The silicon source may be dispersed by adding at 3-5 wt % to the solvent based on 100 wt % of the second solution.

The method for dispersing the silicon source in the solvent is not particularly limited. For example, it may be dispersed through ball milling, sonication, etc. Also, the dispersing time is not particularly limited and the dispersion may be performed until the silicon source is dispersed uniformly enough.

The solvent of the first solution and the second solution may be selected from a group consisting of ethanol, isopropyl alcohol (IPA) and a mixture thereof.

In the step of preparing the slurry (S3), the second solution is added to the first solution and then mixed.

Specifically, the second solution may be added little by little while stirring the first solution such that the carbon source in the first is uniformly coated on the surface of the silicon source in the second solution. The method and speed of the addition of the second solution are not particularly limited. For example, the second solution may be added by freely dropping through a tube having a small diameter.

The second solution may be added to the first solution as described above such that the molar ratio (C/Si) of the carbon source and the silicon source is 1.0-2.5. The specific surface area, compressive strength, porosity, etc. of the porous silicon carbide structure may be controlled easily by controlling the molar ratio (C/Si) of the carbon source and the silicon source. If the molar ratio is increased, the porosity is increased but the compressive strength is decreased. Therefore, the molar ratio may be controlled specifically to 1.0-2.5 for balancing of them.

Specifically, the mixture may be mixed sufficiently at 200-400 rpm after the second solution is added.

In addition, a processing aid may be further added to and dispersed in the slurry. The processing aid serves to allow easy formation of the preform in the form of a powder, which will be described later. The processing aid may be selected from a group consisting of polyvinyl butyral (PVB), polyvinyl alcohol (PVA), polyvinylpyrrolidone (PVP) and a mixture thereof and its content may be 0.3-0.5 wt % based on 100 wt % of the carbon source and the silicon source. If the content is smaller than 0.3 wt %, the effect of adding the processing aid cannot be achieved. And, if it exceeds 0.5 wt %, the physical properties, etc. of the porous silicon carbide structure may be negatively affected.

In the step of granulating the slurry (S4), a powder wherein the carbon source is coated on the surface of the silicon source is obtained.

In the process of preparing the powder wherein the carbon source is coated on the surface of the silicon source by drying the slurry, the granulation may be performed through stirring vacuum drying or partial drying in order to prevent separation due to the difference in the size of the silicon source and the carbon source. Here, the 'stirring vacuum drying' refers to a method of stirring the solution (or slurry) wherein the first solution in which the carbon source is dispersed and the second solution in which the silicon source is dispersed using a rotary evaporator and then drying the same using a water pump while maintaining a vacuum state.

Specifically, the slurry may be granulated by drying under a vacuum atmosphere at 20-40° C. for 30-60 minutes such that the solvent remains with a low content, specifically 1-5 wt %.

The powder wherein the carbon source is coated on the surface of the silicon source obtained through the granulation may have an average particle diameter of 50-200 μm.

In the step of forming the preform (S5), a preform with a predetermined shape is formed by compressing the powder wherein the carbon source is coated on the surface of the silicon source.

Because the preform with a predetermined shape is prepared first as described above and then the porous silicon carbide structure is prepared by direct carbonization or carbothermal reduction rather than porous silicon carbide is prepared and then the structure is prepared by compressing the same, compressive strength can be improved remarkably.

The condition of the compression is not particularly limited. For example, the preform may be formed by compressing the powder wherein the carbon source is coated on the surface of the silicon source at 0.3-1 MPa.

The shape of the preform is not particularly limited and may be selected adequately depending on applications, etc.

In the step of heat-treating the preform (S6), a porous silicon carbide structure is formed by heating the preform formed of the powder wherein the carbon source is coated on the surface of the silicon source to cause a reaction between the silicon source and the carbon source.

The heat treatment may be performed by raising temperature to 1150-1400° C. at a rate of 1-3° C./min and then heat-treating the preform for 10-24 hours under an inert atmosphere.

Alternatively, the preform may be heat-treated firstly at 100-200° C. for 1-3 hours, heat-treated secondly at 500-800° C. for 30 minutes to 3 hours after raising temperature at a rate of 5-10° C./min and heat-treated thirdly at 1150-1400° C. for 10-24 hours after raising temperature at a rate of 1-10° C./min, wherein the first heat treatment, the second heat treatment and the heat treatment may be performed continuously under an inert atmosphere.

The reaction between the silicon source and the carbon source through the heat treatment may be direct carbonization or carbothermal reduction. Specifically, silicon carbide may be synthesized by reacting the silicon source in the gas phase with the carbon source at a temperature below the melting point of silicon.

The specific surface area, compressive strength, porosity, etc. of the porous silicon carbide structure may be controlled easily by controlling the heat treatment temperature, which will be described later through examples.

The method for preparing a porous silicon carbide structure may further include, after the heat treatment is completed, a step of removing carbon remaining in the porous silicon carbide structure through oxidation at about 700° C. or lower.

The porous silicon carbide structure prepared by the method according to the present invention may contain β-phase silicon carbide and may have a specific surface area of 30-100 $m^2/g$, an average pore size of 5-200 nm, a porosity of 60-80% and a compressive strength of 10-30 MPa.

The average pore size refers to the size of pores formed inside the porous silicon carbide structure measured by the mercury intrusion porosimetry, the porosity refers to the fraction of the volume occupied by the pores based on the total volume of the porous silicon carbide structure and the compressive strength refers to the strength of the prepared porous silicon carbide structure measured according to ASTM C773.

Based on the average pore size, it can be said that the metal catalyst-supported porous silicon carbide structure has meso- or macro-sized pores.

The present invention will be described in more detail through examples. The following examples are for illustrative purposes only and it will be apparent to those skilled in the art that the scope of this invention is not limited by the examples.

Examples 1-4

In order to prepare a porous silicon carbide structure having meso- or macro-sized pores, a silicon powder with an average particle diameter of 10 μm was used as a silicon source and carbon black with an average particle size ($d_{50}$) of 0.08 μm and a specific surface area of 80 m$^2$/g was used as a carbon source. The carbon source and the silicon source were weighed such that a molar ratio (C/Si) was 1.0-2.5.

The carbon black used as the carbon source was wet-mixed in isopropyl alcohol (IPA) to a content of 5 wt % (based on 100 wt % of a first solution). The wet mixing was performed for 12 hours by ball milling using SiC balls with a size of 2 mm or smaller. For uniform dispersion of the carbon black, sonication was performed for 1 hour. After adding silane-based trimethoxymethylsilane as a binder (coupling agent) necessary for binding of the carbon black dispersed uniformly in the solution onto the surface of the silicon source, a first solution was prepared through ball milling and sonification.

After adding the silicon powder to isopropyl alcohol (IPA), a second solution in which the silicon powder was dispersed at 10 wt % (based on 100 wt % of the second solution) was prepared by mixing for 12 hours through ball milling.

A slurry containing a powder wherein the carbon source was coated on the surface of the silicon source was prepared by adding the second solution little by little while stirring the fourth solution and then stirring the same for 12 hours or longer. The addition amount of the second solution was controlled such that the molar ratio (C/Si) of the carbon source and the silicon source was 1.0 (Example 1), 1.5 (Example 2), 2.0 (Example 3) or 2.5 (Example 4). Then, after adding 0.3 wt % of PVB as a processing aid to the slurry based on 100 wt % of the carbon source and the silicon source, the mixture was stirred for 2 hours or longer.

A powder wherein the carbon source was coated on the surface of the silicon source was prepared by stir-drying the slurry under a vacuum atmosphere.

A preform with a cylinder shape was prepared by compressing the powder with a pressure of 0.6 MPa. The preform was dried at room temperature for 24 hours or longer.

A porous silicon carbide structure with a cylinder shape was synthesized by loading the preform in a tube furnace, raising temperature to 200° C. at a rate of 2° C./min, maintaining the temperature for 1 hour, raising temperature to 600° C. at a rate of 10° C./min, maintaining the temperature for 30 minutes, raising temperature to 1250° C. at a rate of 2° C./min and maintaining the temperature for 10 hours, under an argon atmosphere.

A porous silicon carbide structure containing β-phase silicon carbide (β-SiC) was obtained by removing carbon remaining in the synthesized porous silicon carbide structure through oxidation at 700° C. for 2 hours.

The pore characteristics and mechanical properties of the porous silicon carbide structures prepared in Examples 1-4 are summarized in Table 1.

TABLE 1

| Starting materials | | Examples | | | |
|---|---|---|---|---|---|
| | | 1 | 2 | 3 | 4 |
| Starting materials | Carbon source | Carbon black | Carbon black | Carbon black | Carbon black |
| | Silicon source | Silicon powder (10 μm) | Silicon powder (10 μm) | Silicon powder (10 μm) | Silicon powder (10 μm) |
| | C/Si (molar ratio) | 1.0 | 1.5 | 2.0 | 2.5 |
| | Heat treatment temperature/time | 1250° C./10 hours | | | |
| Porous β-SiC structure | Specific surface area (m$^2$/g) | 25 | 66 | 82 | 108 |
| | Strength (MPa) | 31 | 21 | 10 | 5 |
| | Porosity (%) | 65 | 68 | 72 | 77 |

As seen from Table 1, the specific surface area of the prepared porous silicon carbide structure was 5-200 m$^2$/g and the average pore size was about 4-15 nm.

Figure 2:
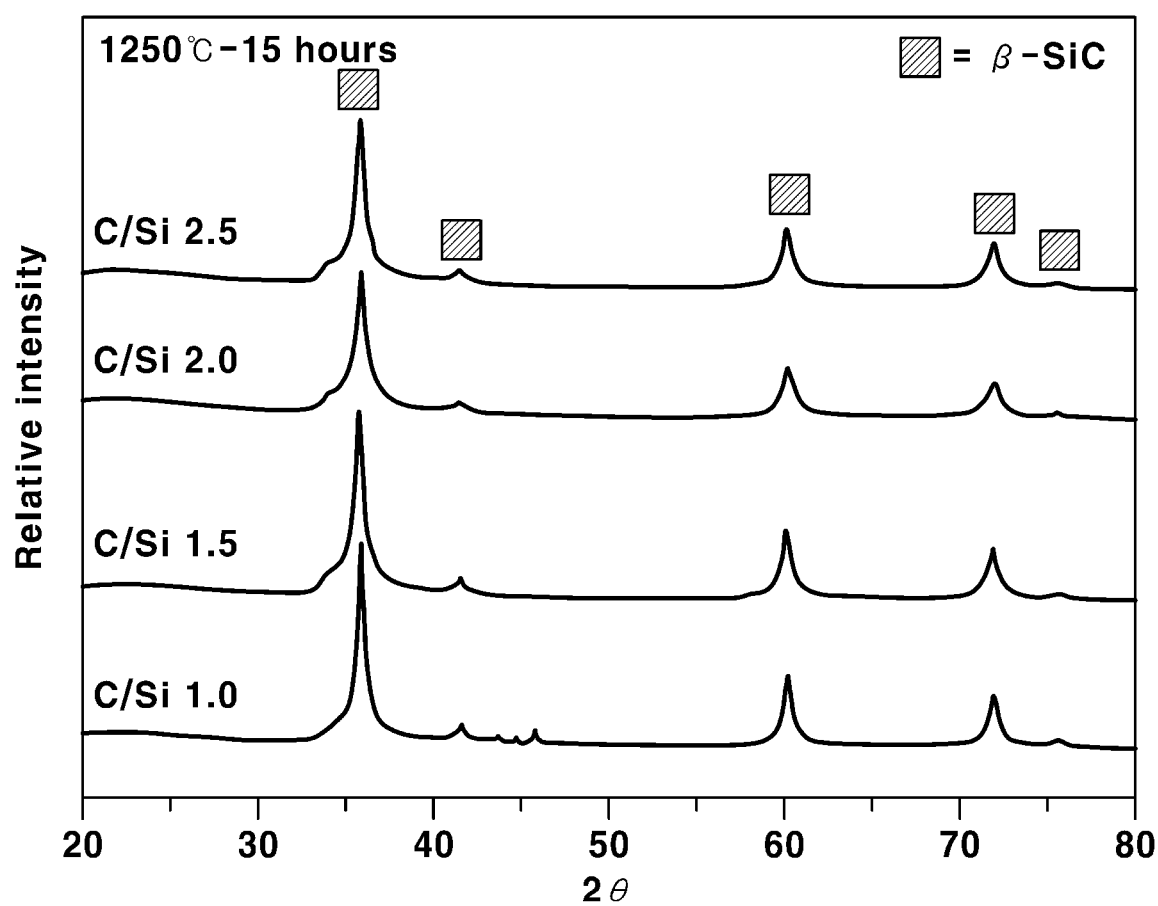
FIG. 2 shows an X-ray diffraction analysis result of porous silicon carbide structures of Examples 1-4.

FIG. 2 shows an X-ray diffraction analysis result for the porous silicon carbide structures of Examples 1-4. Referring to the figure, it can be seen that the porous silicon carbide structures contain β-phase silicon carbide.

Examples 5-7

A porous silicon carbide structure was prepared in the same manner as in Example 1 except that the molar ratio (C/Si) of the carbon source and the silicon source was controlled to 1.5 and the preform was heat-treated under an argon atmosphere by raising temperature to 200° C. at a rate of 2° C./min, maintaining the temperature for 1 hour, raising temperature to 600° C. at a rate of 10° C./min, maintaining the temperature for 30 minutes, raising temperature to 1100° C. (Example 5), 1250° C. (Example 6) or 1400° C. (Example 7) at a rate of 2° C./min and maintaining the temperature for 10 hours.

The pore characteristics and mechanical properties of the porous silicon carbide structures prepared in Examples 5-7 are summarized in Table 2.

TABLE 2

| | | Examples | | |
|---|---|---|---|---|
| | | 5 | 6 | 7 |
| Starting materials | Carbon source | Carbon black | Carbon black | Carbon black |
| | Silicon source | Silicon powder (10 μm) | Silicon powder (10 μm) | Silicon powder (10 μm) |
| | C/Si (molar ratio) | 1.5 | 1.5 | 1.5 |
| | Heat treatment temperature/time | 1100° C./10 | 1250° C./10 | 1400° C./10 |

TABLE 2-continued

| | | Examples | | |
|---|---|---|---|---|
| | | 5 | 6 | 7 |
| Porous β-SiC structure | Specific surface area (m$^2$/g) | 48 | 66 | 85 |
| | Strength (MPa) | 19 | 21 | 13 |
| | Porosity (%) | 68 | 68 | 74 |

Examples 8-11

A porous silicon carbide structure was prepared in the same manner as in Example 1 except that silicon powder having an average particle diameter of 0.2 μm (Example 8), 1 μm (Example 9), 3 μm (Example 10) or 10 μm (Example 9) was used.

The pore characteristics and mechanical properties of the porous silicon carbide structures prepared in Examples 8-11 are summarized in Table 3.

Figure 3:
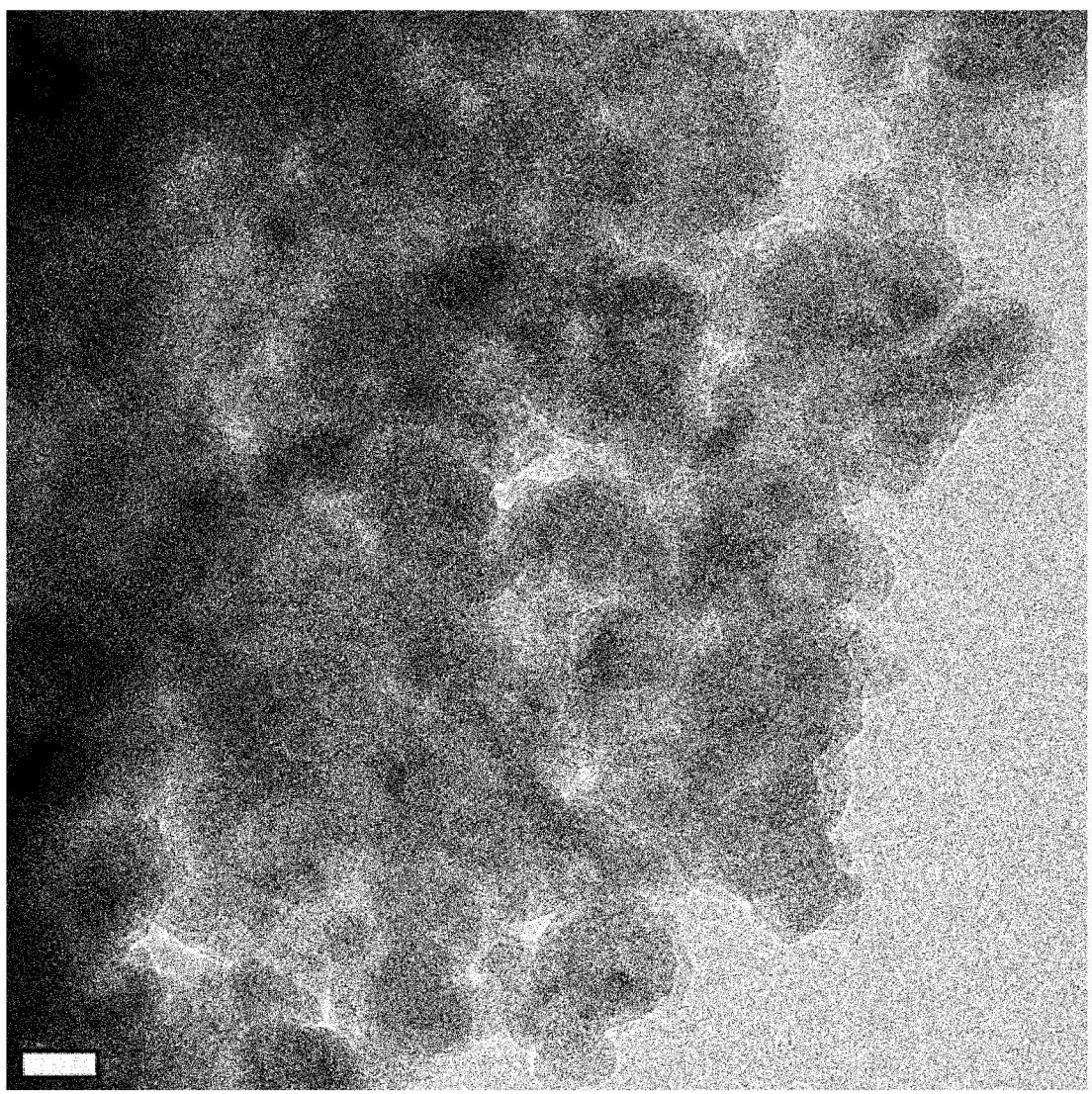
FIG. 3 shows a TEM (transmission electron microscopic) image of a porous silicon carbide structure prepared in Example 8 at ×500,000 magnification.
Figure 4:
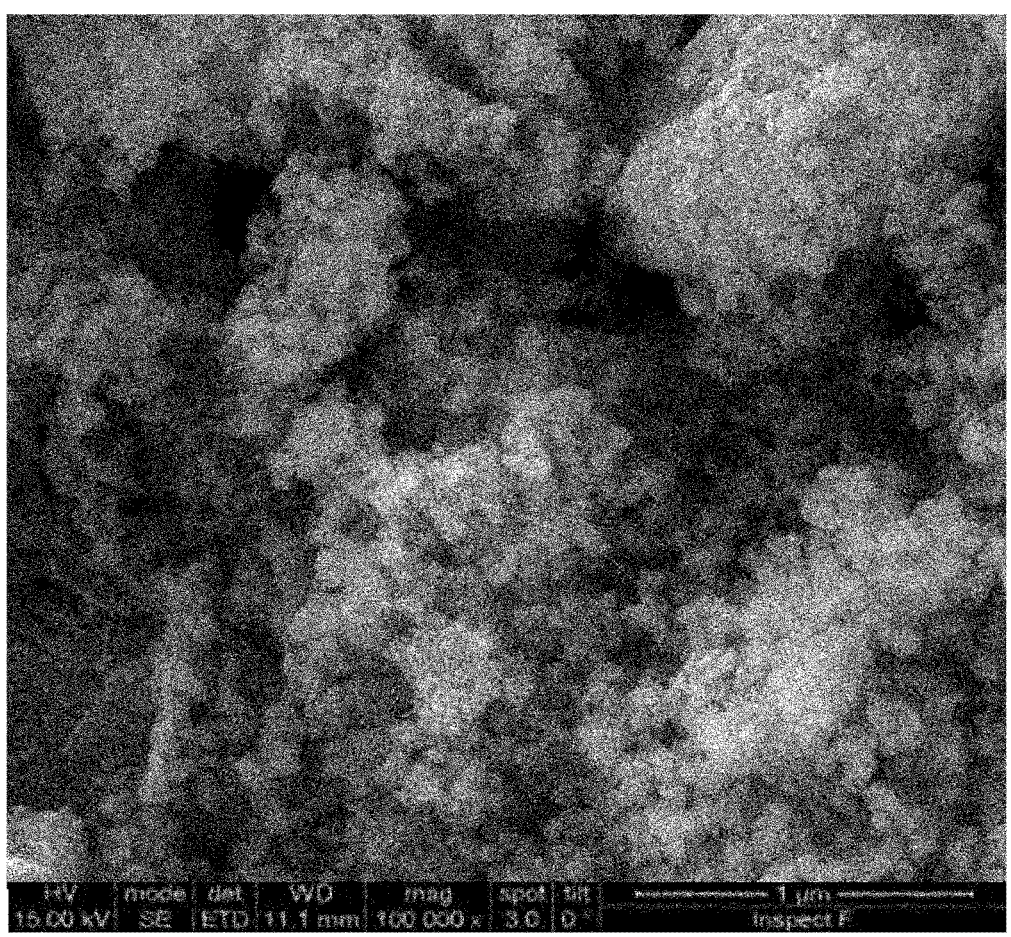
FIG. 4 shows an SEM (scanning electron microscopic) image of a porous silicon carbide structure prepared in Example 10 at ×100,000 magnification.

FIG. 3 shows a TEM image of the porous silicon carbide structure prepared in Example 8 at ×500,000 magnification. And, FIG. 4 shows an SEM image of the porous silicon carbide structure prepared in Example 10 at ×100,000 magnification.

TABLE 3

| | | Examples | | | |
|---|---|---|---|---|---|
| | | 8 | 9 | 10 | 11 |
| Starting materials | Carbon source | Carbon black | Carbon black | Carbon black | Carbon black |
| | Silicon source | Silicon powder (0.2 μm) | Silicon powder (1 μm) | Silicon powder (3 μm) | Silicon powder (10 μm) |
| | C/Si (molar ratio) | 1.5 | 1.5 | 1.5 | 1.5 |
| Heat treatment temperature/time | | 1250° C./10 hours | | | |
| Porous β-SiC structure | Specific surface area (m$^2$/g) | 45 | 55 | 60 | 66 |
| | Strength (MPa) | 6 | 11 | 16 | 21 |
| | Porosity (%) | 80 | 78 | 73 | 68 |

Examples 12-16

A porous silicon carbide structure was prepared in the same manner as in Example 1 except that silicon powder having an average particle diameter of 10 μm was used as a silicon source and carbon black having an average particle size ($d_{50}$) of 0.08 μm and a specific surface area of 80 m$^2$/g and a multi-walled carbon nanotube having a length of 10-30 μm and a BET of 200 m$^2$/g were used as carbon sources, with 100:0 (Example 12), 97:3 (Example 13), 95:5 (Example 14), 93:7 (Example 15) or 90:10 (Example 16) based on 100 wt % of the carbon source.

The pore characteristics and mechanical properties of the porous silicon carbide structures prepared in Examples 12-16 are summarized in Table 4.

TABLE 4

| | | Examples | | | | |
|---|---|---|---|---|---|---|
| | | 12 | 13 | 14 | 15 | 16 |
| Starting materials | Carbon source | Carbon black:CNT (100:0) wt % | Carbon black:CNT (97:3) wt % | Carbon black:CNT (95:5) wt % | Carbon black:CNT (93:7) wt % | Carbon black:CNT (90:10) wt % |
| | Silicon source | Silicon powder (10 μm) | Silicon powder (10 μm) | Silicon powder (10 μm) | Silicon powder (10 μm) | Silicon powder (10 μm) |
| | C/Si (molar ratio) | 1.5 | 1.5 | 1.5 | 1.5 | 1.5 |
| Heat treatment temperature/time | | 1250° C./10 hours | | | | |
| Porous β-SiC structure | Specific surface area (m$^2$/g) | 66 | 55 | 60 | 66 | 58 |
| | Strength (MPa) | 21 | 16 | 10.7 | 7.4 | 4.5 |
| | Porosity (%) | 68 | 70 | 73 | 78 | 81 |

From Examples 1-16, it can be seen that the preparation method according to the present invention is advantageous in that the pore size, porosity, specific surface area, etc. of the porous silicon carbide structure can be controlled through conditions that can be controlled relatively easily, such as the composition of the carbon source and the silicon source, the size of the silicon source, the type and size of the carbon source, heat treatment temperature, etc.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

Porous ceramic structures are widely used as dust filters, catalyst supports, adsorbents, insulating materials, filter materials, electrode materials and artificial biomaterials and in applications requiring wear resistance, chemical resistance and heat resistance properties where porous polymer or metallic materials cannot be used. In particular, silicon carbide is used as a key material that can be used in harsh environments to which the existing porous oxide structures cannot be applied in chemical, environmental and energy industries because it has superior heat resistance, mechanical properties and chemical resistance. Because the method for preparing a meso- to macroporous silicon carbide structure according to the present invention allows preparation of the meso- to macroporous silicon carbide structure using general carbon source and silicon powder without using the expensive nanoporous carbon structure or silica as silica starting materials and without using the environmentally harmful phenolic resin as a carbon source economically through an eco-friendly process, the silicon carbide structure can be used as a high-functionality, high-durability filter material or a catalyst support in chemical, environmental and energy industries and is used as a catalyst support for partial oxidation of methane, a catalyst support for selective oxidation of $H_2S$ or a catalyst support for Fischer-Tropsch reaction. In addition, its application can be extended to filter materials, catalyst supports, chucking materials and carrier materials required for semiconductor and display industries where the use of a phenolic resin is prohibited.

What is claimed is:

1. A method for preparing a porous silicon carbide structure, comprising:
   preparing a first solution by dispersing a carbon source and a binder in a solvent;
   preparing a second solution by dispersing a silicon source in a solvent;
   preparing a slurry by adding the second solution to the first solution and mixing the same;
   obtaining a powder wherein the carbon source is coated on the surface of the silicon source by granulating the slurry;
   forming a preform of a predetermined shape from the powder; and
   heat-treating the preform,
   wherein the carbon source does not comprise a phenolic resin.

2. The method for preparing a porous silicon carbide structure according to claim 1, wherein the carbon source is carbon black having an average particle diameter ($d_{50}$) of 0.08-45 μm and a specific surface area of 80-200 $m^2/g$.

3. The method for preparing a porous silicon carbide structure according to claim 2, wherein the carbon source further comprises 3-10 wt % of one selected from a group consisting of a single-walled carbon nanotube (SWCNT), a double-walled carbon nanotube (DWCNT), a multi-walled carbon nanotube (MWCNT) and a mixture thereof having a length of 10-30 μm based on 100 wt % of the carbon source.

4. The method for preparing a porous silicon carbide structure according to claim 1, wherein the binder is a silane-based binder selected from a group consisting of hexadecyltrimethoxysilane, trimethoxymethylsilane, trimethoxy(propyl)silane, trimethoxyhexylsilane and a mixture thereof.

5. The method for preparing a porous silicon carbide structure according to claim 1, wherein the silicon source is a silicon powder having an average particle diameter of 0.2-10 μm.

6. The method for preparing a porous silicon carbide structure according to claim 1, wherein the solvent of the first solution and the second solution is selected from a group consisting of ethanol, isopropyl alcohol (IPA) and a mixture thereof.

7. The method for preparing a porous silicon carbide structure according to claim 1, wherein the second solution is added to the first solution such that a molar ratio (C/Si) of the carbon source and the silicon source is 1.0-2.5.

8. The method for preparing a porous silicon carbide structure according to claim 7, wherein the second solution is added little by little while stirring the first solution and then mixed at 200-400 rpm.

9. The method for preparing a porous silicon carbide structure according to claim 1, wherein, before granulating the slurry, a processing aid selected from a group consisting of polyvinyl butyral (PVB), polyvinyl alcohol (PVA), polyvinylpyrrolidone (PVP) and a mixture thereof is added to the slurry.

10. The method for preparing a porous silicon carbide structure according to claim 1, wherein the granulation of the slurry is performed by drying the slurry under a vacuum atmosphere at 20-40° C. for 30-60 minutes such that the solvent remains at a content of 1-5 wt %.

11. The method for preparing a porous silicon carbide structure according to claim 1, wherein the powder wherein the carbon source is coated on the silicon source has an average particle diameter of 50-200 μm.

12. The method for preparing a porous silicon carbide structure according to claim 1, wherein the powder is formed into the preform of a predetermined shape by compressing at 0.3-1 MPa.

13. The method for preparing a porous silicon carbide structure according to claim 1, wherein the preform is heat-treated firstly at 100-200° C. for 1-3 hours, heat-treated secondly at 500-800° C. for 30 minutes to 3 hours after raising temperature at a rate of 5-10° C./min and heat-treated thirdly at 1150-1400° C. for 10-24 hours after raising temperature at a rate of 1-10° C./min, wherein the first heat treatment, the second heat treatment and the heat treatment are performed continuously under an inert atmosphere.

14. The method for preparing a porous silicon carbide structure according to claim 1, wherein the preform is heat-treated under an inert atmosphere at 1150-1400° C. for 10-24 hours after raising temperature at a rate of 1-3° C./min.

15. The method for preparing a porous silicon carbide structure according to claim 1, which further comprises, after the heat treatment is completed, removing carbon remaining in the porous silicon carbide structure through oxidation.

16. The method for preparing a porous silicon carbide structure according to claim 1, wherein the porous silicon carbide structure comprises β-phase silicon carbide.

17. The method for preparing a porous silicon carbide structure according to claim 1, wherein the porous silicon carbide structure has a specific surface area of 30-100 $m^2/g$, an average pore size of 5-200 nm, a porosity of 60-80% and a compressive strength of 10-30 MPa.

* * * * *